(12) United States Patent
Felty et al.

(10) Patent No.: US 8,977,373 B2
(45) Date of Patent: Mar. 10, 2015

(54) SYSTEMS AND METHODS FOR EXTENDING PHYSICAL SENSOR RANGE USING VIRTUAL SENSORS

(75) Inventors: Timothy Joe Felty, East Peoria, IL (US); James Robert Mason, Peoria, IL (US); Stuart Paul Smith, Stamford (GB); Anthony James Grichnik, Eureka, IL (US); Gavin Peter Williams, Ryhall (GB)

(73) Assignee: Caterpillar Inc., Peoria, IL (US)

( * ) Notice: Subject to any disclaimer, the term of this patent is extended or adjusted under 35 U.S.C. 154(b) by 545 days.

(21) Appl. No.: 13/338,646

(22) Filed: Dec. 28, 2011

(65) Prior Publication Data

US 2013/0173028 A1    Jul. 4, 2013

(51) Int. Cl.
*G05B 9/02*    (2006.01)

(52) U.S. Cl.
USPC .......................................................... 700/79

(58) Field of Classification Search
None
See application file for complete search history.

(56) References Cited

U.S. PATENT DOCUMENTS

| | | | |
|---|---|---|---|
| 5,386,373 A | 1/1995 | Keeler et al. | |
| 5,682,317 A | 10/1997 | Keeler et al. | |
| 6,519,552 B1 | 2/2003 | Sampath et al. | |
| 7,231,291 B2 * | 6/2007 | Dollmeyer et al. | 701/114 |
| 7,477,996 B2 * | 1/2009 | Dozoretz et al. | 702/50 |
| 7,787,969 B2 | 8/2010 | Grichnik et al. | |
| 7,917,333 B2 | 3/2011 | Grichnik et al. | |
| 8,036,764 B2 | 10/2011 | Grichnik et al. | |
| 2004/0230368 A1 | 11/2004 | Kropinski et al. | |
| 2004/0254767 A1 | 12/2004 | Merkin | |
| 2005/0043934 A1 | 2/2005 | Hartmann et al. | |
| 2007/0118338 A1 | 5/2007 | Grichnik et al. | |
| 2008/0312756 A1 | 12/2008 | Grichnik et al. | |
| 2009/0063087 A1 * | 3/2009 | Grichnik et al. | 702/127 |
| 2010/0050025 A1 * | 2/2010 | Grichnik et al. | 714/47 |

* cited by examiner

*Primary Examiner* — Sean Shechtman
*Assistant Examiner* — Steven Garland
(74) *Attorney, Agent, or Firm* — Finnegan, Henderson, Farabow, Garrett & Dunner, LLP

(57) ABSTRACT

A control system is disclosed. The control system may have a physical sensor that may output a physical output value, and a virtual sensor network that may output a virtual output value. The control system may also have an electronic control module that may be configured to receive the physical output value from the physical sensor and receive the virtual output value from the virtual sensor. The electronic control module may be further configured to determine a trust level of the physical sensor based on the physical output value, and determine that the trust level of the physical sensor is below a first threshold trust value. The electronic control module may control a machine based on the virtual output value responsive to determining that the trust level of the physical sensor is below the first threshold trust value.

20 Claims, 7 Drawing Sheets

SYSTEMS AND METHODS FOR EXTENDING PHYSICAL SENSOR RANGE USING VIRTUAL SENSORS

TECHNICAL FIELD

This disclosure relates generally to extending a physical sensor range and, more particularly, to extending a physical sensor range using one or more virtual sensors.

BACKGROUND

Physical sensors are used in many modern machines to measure and monitor physical phenomena, such as temperature, speed, and fluid flow constituents. Physical sensors often take direct measurements of the physical phenomena and convert these measurements into measurement data to be further processed by control systems. Many physical sensors have specification ranges within which the physical sensor is calibrated to measure data accurately. Moreover, the specification range may vary from sensor to sensor. For example, different temperature sensors may have specification ranges of −40-100° C., 200-500° C., 250-700° C., etc. Likewise, different emissions sensors, pressure sensors, accelerometers, etc., may have their own specification ranges.

In applications, such as monitoring, e.g., emissions of a machine, temperature of various components, airflows, fluids, etc. of a machine, or any other property associated with a machine, multiple different sensors may be used based on the range of values being measured. In the temperature monitoring example, temperatures sensors may be needed such that each temperature sensor has a specification range that covers the corresponding expected range of temperature to be measured. Thus, an organization that manufactures or operates the machine may have to source multiple different temperature sensors based on the different ranges of temperatures being measured, increasing logistical complexity and cost. Moreover, in some applications the expected range of temperatures to be measured may be larger than the specification range of a reasonably-priced sensor. In these instances, a more expensive sensor may increase the overall cost of the machine.

Instead of direct measurements, virtual sensors are developed to process other physically measured values and to produce values that were previously measured directly by physical sensors. For example, U.S. Pat. No. 5,386,373 (the '373 patent) issued to Keeler et al. on Jan. 31, 1995, discloses a virtual continuous emission monitoring system with sensor validation. The system of the '373 patent compares a difference between an actual sensor output and a predicted sensor output to a threshold value. If the difference exceeds a threshold value, the system may replace the actual sensor output with the predicted sensor output, and control the system based on the predicted sensor output. The techniques disclosed in the '373 patent may protect against a faulty sensor. However, the techniques of the '373 patent may only calculate a difference between an actual sensor output and a predicted sensor output, and, as such, may be incapable of extending a range of a physical sensor using a virtual sensor.

The disclosed methods and systems are directed to solving one or more of the problems set forth above and/or other problems of the prior art.

SUMMARY

In one aspect, the present disclosure is directed to a virtual sensor network system. The virtual sensor network system may include a physical sensor that may be configured to output a physical output value, and a virtual sensor network that may be configured to output a virtual output value. The control system may also include an electronic control module that may be configured to receive the physical output value from the physical sensor and receive the virtual output value from the virtual sensor. The electronic control module may be further configured to determine a trust level of the physical sensor based on the physical output value, and determine that the trust level of the physical sensor is below a first threshold trust value. The electronic control module may control a machine based on the virtual output value responsive to determining that the trust level of the physical sensor is below the first threshold trust value.

In another aspect, the present disclosure is directed to a. computer-implemented method. The method may include receiving a physical output value from a physical sensor and receiving a virtual output value from a virtual sensor. The method may further include determining a trust level of the physical sensor based on the physical output value and determining that the trust level of the physical sensor is below a first threshold trust value. The method may still further include controlling a machine based on the virtual output value responsive to determining that the trust level of the physical sensor is below the first threshold trust value.

In yet another aspect, the present disclosure is directed to another computer-implemented method. The method may include receiving a physical output value from a physical sensor and receiving a virtual output value from a virtual sensor. The method may also include comparing the physical output value to a trusted range and, responsive to determining that the physical output value is outside of the trusted range, controlling the machine using a combined output value that is a combination of the physical output value and the virtual output value.

DETAILED DESCRIPTION

Figure 1:
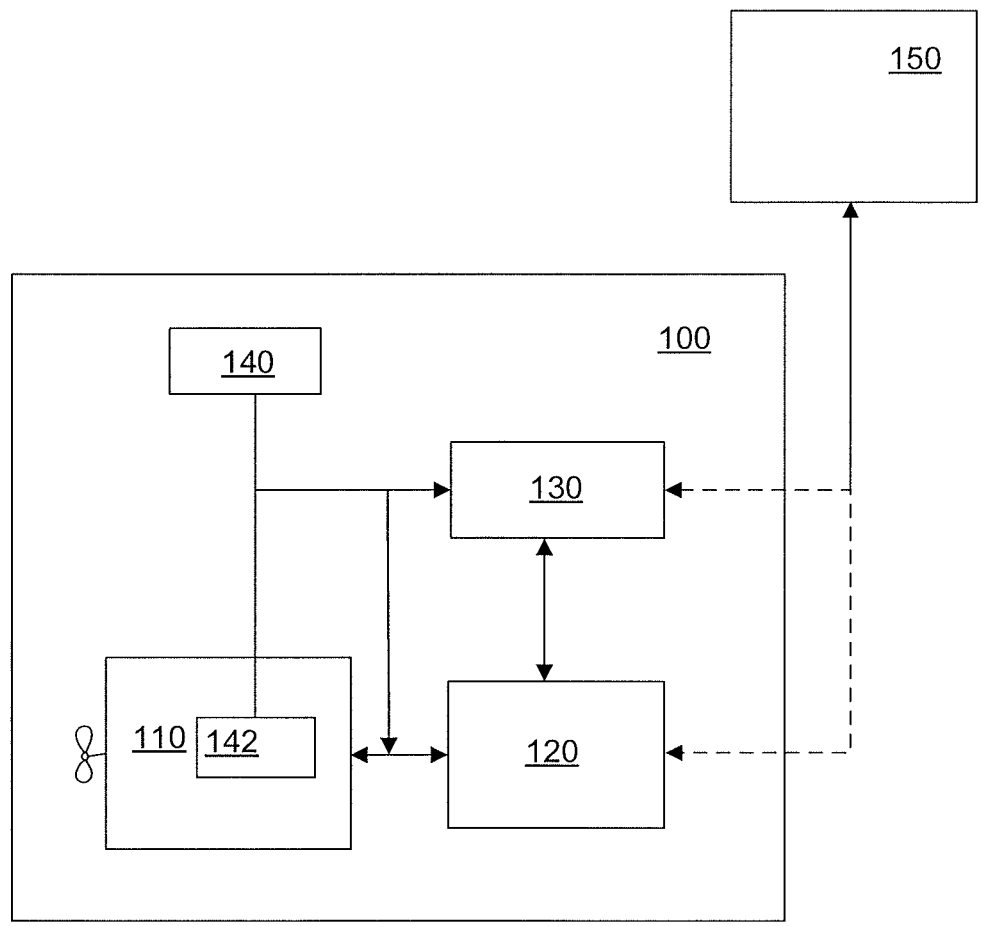
FIG. 1 is a diagrammatic illustration of an exemplary disclosed machine.

FIG. 1 illustrates an exemplary machine 100 in which features and principles consistent with certain disclosed embodiments may be incorporated. Machine 100 may refer to any type of stationary or mobile machine that performs some type of operation associated with a particular industry, e.g., construction, transportation, etc. Machine 100 may also include any type of commercial vehicle such as a car, van, and other vehicle. Other types of machines may also be included.

As shown in FIG. 1, machine 100 may include an engine 110, an electronic control module (ECM) 120, a virtual sensor network system 130, and physical sensors 140 and 142. Engine 110 may include any appropriate type of engine or power source that generates power for machine 100, such as an internal combustion engine or fuel cell generator. ECM 120 may include any appropriate type of engine control system configured to perform engine control functions such that engine 110 may operate properly. ECM 120 may include any number of devices, such as microprocessors or microcontrollers, application-specific integrated circuits (ASICs), field programmable gate arrays (FPGAs), memory modules, communication devices, input/output devices, storages devices, etc., to perform such control functions. Further, computer software instructions may be stored in or loaded to ECM 120. ECM 120 may execute the computer software instructions to perform various control functions and processes.

Although ECM 120 is shown to control engine 110, ECM 120 may also control other systems of machine 100, such as transmission systems and/or hydraulics systems. Multiple ECMs may be included in ECM 120 or may be used on machine 100. For example, a plurality of ECMs may be used to control different systems of machine 100 and also to coordinate operations of these systems. Further, the plurality of ECMs may be coupled together via a communication network to exchange information. Information such as input parameters, output parameters, parameter values, status of control systems, and other information from physical and virtual sensors and virtual sensor networks may be communicated to the plurality of ECMs simultaneously.

Physical sensor 140 may include one or more sensors provided for measuring certain parameters related to machine 100 and providing corresponding parameter values. For example, physical sensor 140 may include physical temperature sensors, pressure sensors, speed sensors, power output sensors, emission sensors (e.g., Nitrogen Oxides ($NO_x$), Sulfur Dioxide ($SO_2$), Carbon Monoxide (CO), and/or total reduced Sulfur (TRS) sensors), etc. Physical sensor 142 may likewise include one or more sensors that are used with engine 110 or other machine components (not shown) to provide various measured parameter values about engine 110 or other components, such as temperature, speed, acceleration rate, air pressure, fuel pressure, power output, etc.

One or more of physical sensors 140 and 142 may have specification ranges within which each physical sensor is calibrated to accurately measure data. Moreover, within these specification ranges, the physical sensor may have one or more accuracy bands or ranges in which the physical sensor takes measurements with a determined accuracy. For example, a physical temperature sensor may have a specification range from 0-100° C. Within that specification range, the physical temperature sensor may have a first accuracy band from 20-80° C. in which the physical temperature sensor may measure temperature within, e.g., a 2% error. The physical temperature sensor may also have a second accuracy band from 0-20 and 80-100° C. in which the physical temperature sensor may measure temperature within, e.g., a 5 to 10% error. The specification ranges and accuracy bands may be provided, e.g., by the manufacturer of the sensor via a specification sheet, may be determined by testing the physical sensor, etc. Moreover, while the example above includes a single specification range and two accuracy bands, any number of specification ranges and accuracy bands may be determined for a physical sensor.

Virtual sensor network system 130 may be coupled with physical sensors 140 and 142 and ECM 120 to provide control functionalities based on integrated virtual sensors. A virtual sensor, as used herein, may refer to a mathematical algorithm or model that generates and outputs parameter values comparable to a physical sensor based on inputs from other systems, such as physical sensors 140 and 142. For example, a physical temperature sensor, such as a temperature sensor between a turbocharger and a diesel particulate filter of a diesel engine, such as engine 110, may measure exhaust gas temperature from engine 110. A virtual temperature sensor may provide calculated parameter values of the exhaust gas temperature to ECM 120 based on other measured or calculated parameters, such as, e.g., compression ratios, turbocharger efficiencies, aftercooler characteristics, temperature values, pressure values, ambient conditions, fuel rates, engine speeds, etc. In certain embodiments, ECM 120 may receive outputs from both the virtual temperature sensor and a physical temperature sensor and may extend the range of the physical temperature sensor using the virtual temperature sensor in accordance with one or more embodiments discussed below.

A virtual sensor network, as used herein, may refer to one or more virtual sensors integrated and working together to generate and output parameter values. For example, virtual sensor network system 130 may include a plurality of virtual sensors configured or established according to certain criteria based on a particular application. Virtual sensor network system 130 may also facilitate or control operations of the plurality of virtual sensors. The plurality of virtual sensors may include any appropriate virtual sensor providing output parameter values corresponding to one or more physical sensors in machine 100. The term "virtual sensor" may be used interchangeably with "virtual sensor model."

Further, virtual sensor network system 130 may be configured as a separate control system or, alternatively, may coincide with other control systems such as ECM 120. Virtual sensor network system 130 may also operate in series with or in parallel with ECM 120.

A server computer 150 may be coupled to machine 100, either onboard machine 100 or at an offline location. Server computer 150 may include any appropriate computer system configured to create, train, and validate virtual sensor models and/or virtual sensor network models. Server computer 150 may also deploy the virtual sensor models and/or the virtual sensor network models to virtual sensor network system 130 and/or ECM 120 if virtual sensor network system 130 coincides with ECM 120. Further, server computer 150 may communicate with virtual sensor network system 130 and/or ECM 120 to exchange operational and configuration data, such as information that may be used to extend a range of one or more of physical sensors 140 and 142 using virtual sensors in virtual sensor network system 130. Server computer 150 may communicate with virtual sensor network system 130 and/or ECM 120 via any appropriate communication means, such as a computer network or a wireless telecommunication link.

Figure 2:
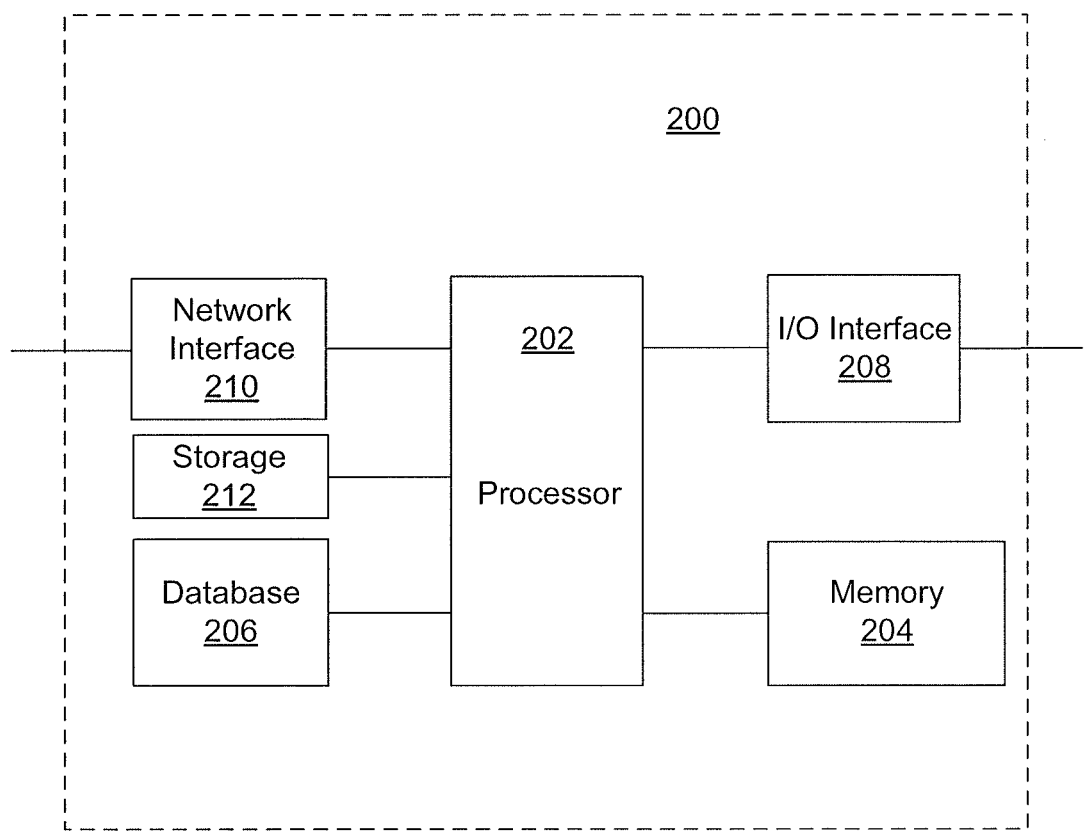
FIG. 2 is a block diagram of a exemplary computer system that may be incorporated into the machine of FIG. 1.

Virtual sensor network system 130 and/or ECM 120 may be implemented by any appropriate computer system. FIG. 2 shows an exemplary functional block diagram of a computer system 200 configured to implement virtual sensor network system 130 and/or ECM 120. Computer system 200 may also include server computer 150 configured to design, train, and validate virtual sensors in virtual sensor network system 130 and other components of machine 100.

As shown in FIG. 2, computer system 200 (e.g., virtual sensor network system 130, ECM 120, etc.) may include a processor 202, a memory 204, a database 206, an I/O interface 208, a network interface 210, and a storage 212. Other components, however, may also be included in computer system 200.

Processor 202 may include any appropriate type of general purpose microprocessor, digital signal processor, or microcontroller. Memory 204 may include one or more memory devices including, but not limited to, a ROM, a flash memory, a dynamic RAM, and a static RAM. Memory 204 may be configured to store information used by processor 202. Database 206 may include any type of appropriate database containing information related to virtual sensor networks, such as characteristics of measured parameters, sensing parameters, mathematical models, and/or any other control information. Storage 212 may include any appropriate type of storage provided to store any type of information that processor 202 may need to operate. For example, storage 212 may include one or more hard disk devices, optical disk devices, or other storage devices to provide storage space.

Memory 204, database 206, and/or storage 212 may also store information that may be used to extend a range of one or more physical sensors using virtual sensors. Such information may include specification information of the physical sensors, e.g., specification ranges, accuracy bands, and trust levels of the physical sensors. Likewise, the information may include specification ranges, accuracy bands, and trust levels of the virtual sensors that may be calculated based on, e.g., data records such as virtual sensor training and/or testing data. Trust levels, which are discussed in greater detail below, are any type of indication reflective of the reliability of a physical or virtual sensor. For example, the trust level may be represented, e.g., by a numerical value reflective of the reliability of a sensor at a particular output parameter value. However, non-numerical trust values may also be used. For example, trust values may be determined to be one of "high," "medium," or "low."

Moreover, memory 204, database 206, and/or storage 212 may store information and/or computer programs used by processor 202 to enable processor 202 to perform functions consistent with disclosed embodiments, e.g., the processes described with regard to FIGS. 4-6, discussed in greater detail below. For example, memory 204, database 206, and/or storage 212 may include information and/or computer programs that enable processor 202 to receive an output parameter value from one or more of physical sensors 140 and 142 (e.g., a physical output value), receive an output parameter value from a virtual sensor of virtual sensor network system 130 (e.g., a virtual output value), and control a machine based on the physical output value, the virtual output value, or a combination of both values, such that processor 202 is capable of controlling machine 100 for output values that are beyond the specification range of the physical sensor.

I/O interface 208 may be configured to obtain data from input/output devices, such as various sensors or other components (e.g., physical sensors 140 and 142) and/or to transmit data to these components. Network interface 210 may include any appropriate type of network device capable of communicating with other computer systems based on one or more wired or wireless communication protocols. Any or all of the components of computer system 200 may be implemented or integrated into an application-specific integrated circuit (ASIC) or field programmable gate array (FPGA) device, or other integrated circuit devices.

Figure 3A:
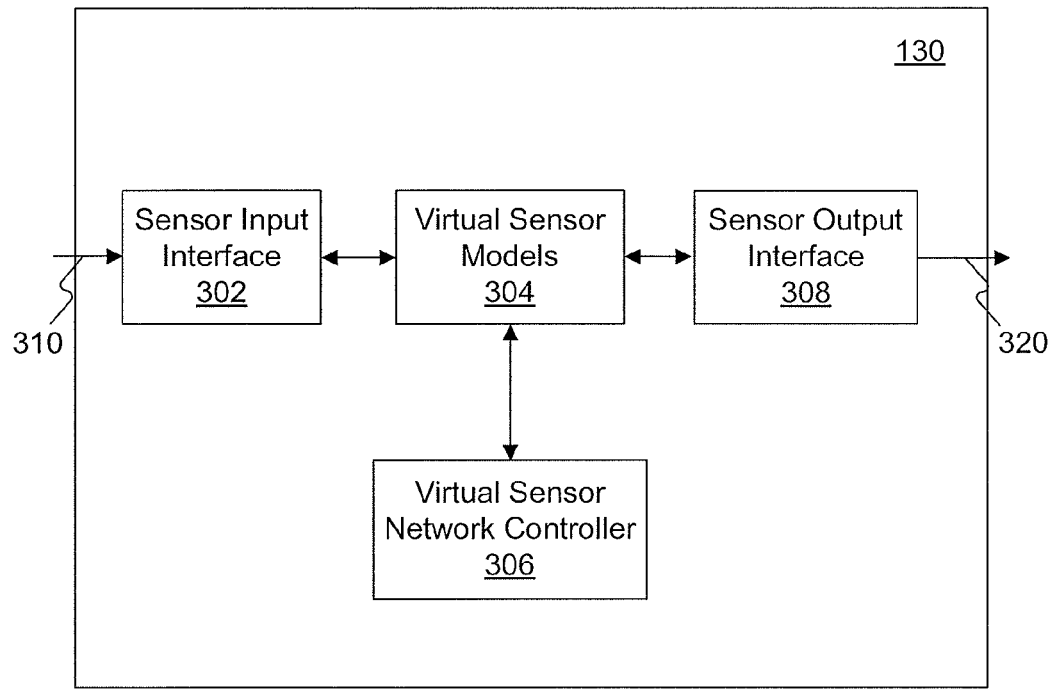
FIG. 3A is a block diagram of an exemplary virtual sensor network system that may be incorporated into the machine of FIG. 1.

FIG. 3A shows a functional block diagram of virtual sensor network system 130 consistent with disclosed embodiments. As shown in FIG. 3A, virtual sensor network system 130 may include a sensor input interface 302, virtual sensor models 304, a virtual sensor network controller 306, and a sensor output interface 308. Input parameter values 310 are provided to sensor input interface 302 and output parameter values 320 are provided by sensor output interface 308.

Sensor input interface 302 may include any appropriate interface, such as an I/O interface or a data link configured to obtain information from various physical sensors (e.g., physical sensors 140 and 142) and/or from ECM 120. The information may include values of input or control parameters of the physical sensors, operational status of the physical sensors, and/or values of output parameters of the physical sensors. The information may also include values of input parameters from ECM 120 that may be sent to replace parameter values otherwise received from physical sensors 140 and 142. Further, the information may be provided to sensor input interface 302 as input parameter values 310.

Sensor output interface 308 may include any appropriate interface, such as an I/O interface or a datalink interface (e.g., an ECM/xPC interface), configured to provide information from virtual sensor models 304 and virtual sensor network controller 306 to external systems, such as ECM 120, or to an external user of virtual sensor network system 130, etc. The information may be provided to external systems and/or users as output parameter values 320.

Figure 3B:
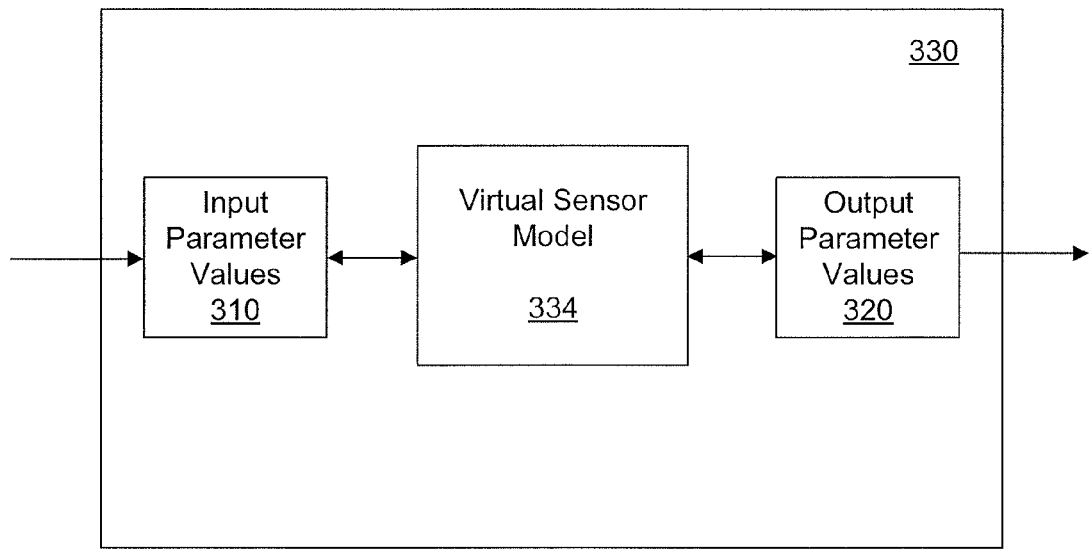
FIG. 3B is a block diagram of an exemplary virtual sensor that may be incorporated into the machine of FIG. 1.

Virtual sensor models 304 may include a plurality of virtual sensors, such as virtual temperature sensors, virtual emission sensors, virtual fuel sensors, virtual pressure sensors, virtual speed sensors, etc. Any virtual sensor may be included in virtual sensor models 304. FIG. 3B shows an exemplary virtual sensor 330 consistent with the disclosed embodiments.

As shown in FIG. 3B, virtual sensor 330 may include a virtual sensor model 334, input parameter values 310, and output parameter values 320. Virtual sensor model 334 may be established to link (e.g. build interrelationships) between input parameter values 310 (e.g., measured parameter values) and output parameter values 320 (e.g., sensing parameter values). After virtual sensor model 334 is established, input parameter values 310 may be provided to virtual sensor model 334 to generate output parameter values 320 based on the given input parameter values 310 and the interrelationships between input parameter values 310 and output parameter values 320 established by virtual sensor model 334.

In one embodiment, virtual sensor 330 may be configured to include a virtual temperature sensor to output exhaust gas temperature levels in a pipe between a turbocharger and a diesel particulate filter of engine 110, or may output other temperature levels for other aspects of engine 110. In this embodiment, input parameter values 310 may include any appropriate type of data associated with exhaust gas temperature. For example, input parameter values 310 may include compression ratios, turbocharger efficiencies, aftercooler characteristics, temperature values, pressure values, ambient conditions, fuel rates, engine speeds, etc.

In other embodiments, virtual sensor 330 may be configured to include a virtual emission sensor to provide levels of substance emitted from an exhaust system (not shown) of engine 110, such as levels of nitrogen oxides ($NO_x$), sulfur dioxide ($SO_2$), carbon monoxide (CO), total reduced sulfur (TRS), soot (i.e., a dark powdery deposit of unburned fuel residues in emission), hydrocarbon (HC), etc. Input parameter values 310 may include any appropriate type of data associated with $NO_x$ emission levels. For example, input parameter values 310 may be values of parameters used to control various response characteristics of engine 110 and/or values of parameters associated with conditions corresponding to the operation of engine 110. For example, input parameter values 310 may include values related to fuel injection timing, compression ratios, turbocharger efficiency, aftercooler characteristics, temperature (e.g., intake manifold temperature), pressure (e.g., intake manifold pressure), ambient conditions (e.g., ambient humidity), fuel rates, and engine speeds, etc.

In embodiments where virtual sensor 330 is configured to include a virtual emission sensor, one or more of physical sensors 140 and/or 142 may be a physical emission sensor. In accordance with exemplary methods discussed in greater detail below, the disclosed virtual sensor system may extend the range of the physical emission sensor using virtual sensor 330. These methods may be performed, e.g., during an after-treatment regeneration condition. These methods may also be performed, e.g., while the physical emission sensor is being initialized and/or calibrated.

Other parameters, however, may also be included in any of the embodiments. For example, parameters originated from other vehicle systems, such as chosen transmission gear, axle ratio, elevation and/or inclination of the vehicle, etc., may also be included. Further, input parameter values 310 may be measured by certain physical sensors, such as physical sensor 142, and/or created by other control systems such as ECM 120.

Virtual sensor model 334 may include any appropriate type of mathematical or physical model indicating interrelationships between input parameter values 310 and output parameter values 320. For example, virtual sensor model 334 may be a neural network based mathematical model that is trained to capture interrelationships between input parameter values 310 and output parameter values 320. Other types of mathematical models, such as fuzzy logic models, linear system models, and/or non-linear system models, etc., may also be used. Virtual sensor model 334 may be trained and validated using data records collected from a particular engine application for which virtual sensor model 334 is established. That is, virtual sensor model 334 may be established according to particular rules corresponding to a particular type of model using the data records, and the interrelationships of virtual sensor model 334 may be verified by using part of the data records.

After virtual sensor model 334 is trained and validated, virtual sensor model 334 may be optimized to define a desired input space of input parameter values 310 and/or a desired distribution of output parameter values 320. The validated or optimized virtual sensor model 334 may be used to produce corresponding values of output parameter values 320 when provided with a set of values of input parameter values 310. For example, virtual sensor model 334 may be used to produce a temperature value corresponding to some aspect of engine 110 based on measured parameters such as compression ratios, turbocharger efficiencies, aftercooler characteristics, temperature values, pressure values, ambient conditions, fuel rates, engine speeds, etc.

The establishment and operations of virtual sensor model 334 may be carried out by processor 202 based on computer programs stored at or loaded to virtual sensor network system 130. Alternatively, the establishment of virtual sensor model 334 may be realized by other computer systems, such as ECM 120 or a separate general purpose computer configured to create process models. The created process model may then be loaded to virtual sensor network system 130 for operations. For example, processor 202 may perform a virtual sensor process model generation and optimization process to generate and optimize virtual sensor model 334. FIG. 4 shows an exemplary model generation and optimization process that may be performed by processor 202.

Figure 4:
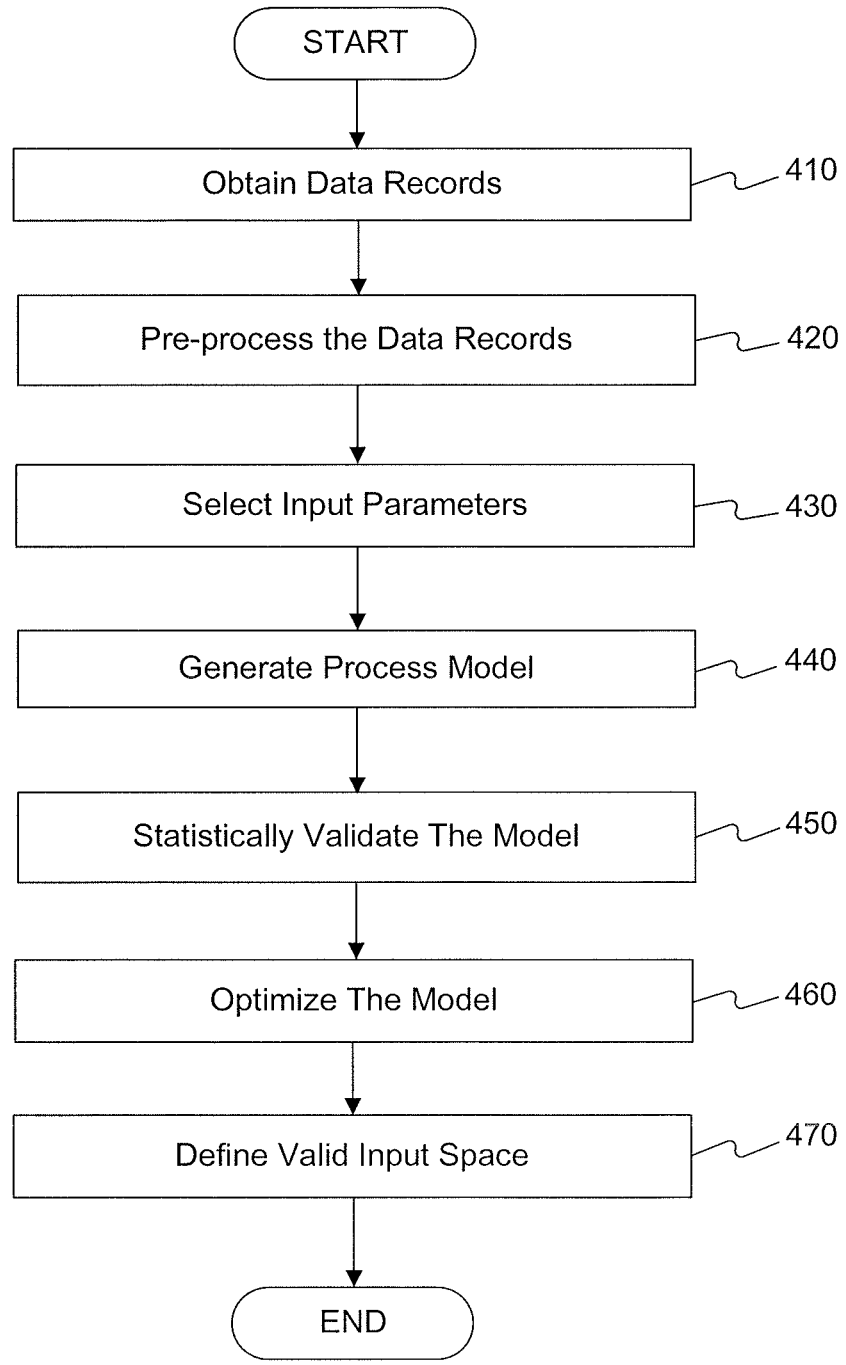
FIG. 4 is a flow chart illustrating an exemplary model generation and optimization process.

As shown in FIG. 4, at the beginning of the model generation and optimization process, processor 202 may obtain data records associated with input parameter values 310 and output parameter values 320 (step 410). The data records may include information characterizing engine operations, including exhaust levels, temperature levels, or any other type of information or data related to machine operations. In certain embodiments physical sensor 140 may include a physical exhaust gas temperature sensor that generates data records regarding output parameter values 320 (e.g., sensing parameters, such as exhaust gas temperature levels). ECM 120 and/or physical sensor 142 may provide data records regarding input parameter values 310 (e.g., measured parameters, such as compression ratios, turbocharger efficiencies, aftercooler characteristics, temperature values, pressure values, ambient conditions, fuel rates, engine speeds, etc.).

Further, the data records may include both input parameter values and output parameter values and may be collected based on various engines or based on a single test engine, under various predetermined operational conditions. The data records may also be collected from experiments designed for collecting such data. Alternatively, the data records may be generated artificially by other related processes, such as other modeling, simulation, or analysis processes. The data records may also include training data used to build virtual sensor model 334 and testing data used to validate virtual sensor model 334. In addition, the data records may also include simulation data used to observe and optimize virtual sensor model 334.

The data records may reflect characteristics of input parameter values 310 and output parameter values 320, such as statistical distributions, normal ranges, precision tolerances, etc. The data records may also reflect other characteristics such as statistical analysis of the rates of change of input parameter values 310 and output parameter values 320. For example, the data records may include maximum rates of change of one or more input parameter values 310 and/or output parameter values 320. Further, the data records may include statistical distributions, normal ranges, weighted moving average value calculations, and/or any other type of statistical analysis known to one of skill in the art, of the rates of change of input parameter values 310 and/or output parameter values 320. This information may likewise be generated by experimental testing, modeling and simulation processes, or by any other method known to one of skill in the art.

The data records may also include information characterizing capabilities of one or more physical sensors, such as physical sensors 140 and 142. For example, the data records may include information regarding the physical sensor's technical specifications, such as specification ranges (i.e., minimum and maximum detectable parameter values of the physical sensor), one or more accuracy bands in which the physical sensor can measure parameter values with a determined accuracy, measurement frequency, a maximum rate of change at which the physical sensor can accurately detect a measured parameter value, etc. Using a temperature sensor as an example, the data records may include a specification range of −50° C. to 350° C. and multiple accuracy bands within the specification range, and may specify that the temperature sensor can make measurements with a frequency of 100 measurements per second with a maximum detectable time-rate of change of the temperature being 100° C. per second.

Once the data records are obtained (step 410), processor 202 may pre-process the data records to clean up the data records for obvious errors and to eliminate redundancies (step 420). Processor 202 may remove approximately identical data records and/or remove data records that are out of a reasonable range in order to be meaningful for model generation and optimization. After the data records have been preprocessed, processor 202 may select proper input parameters by analyzing the data records (step 430).

The data records may be associated with many input variables, such as variables corresponding to fuel injection timing, compression ratios, turbocharger efficiency, aftercooler characteristics, various temperature parameters, various pressure parameters, various ambient conditions, fuel rates, and engine speeds, etc. The number of input variables may be greater than the number of a particular set of input parameters used for virtual sensor model 334. That is, the input parameters may be a subset of the input variables. For example, the input parameters may include intake manifold temperature, intake manifold pressure, ambient humidity, fuel rate, engine speed, etc., of the input variables.

Processor 202 may select the input parameters from the input variables according to predetermined criteria. For example, processor 202 may choose the input parameters by experimentation and/or expert opinions. Alternatively, in certain embodiments, processor 202 may select the input parameters based on a Mahalanobis distance between a normal data set and an abnormal data set of the data records. The normal data set and abnormal data set may be defined by processor 202 using any appropriate method. For example, the normal data set may include characteristic data associated with the input parameters that produce desired output parameters. On the other hand, the abnormal data set may include characteristic data that may be out of tolerance or may need to be avoided. The normal data set and abnormal data set may be predefined by processor 202.

Mahalanobis distance may refer to a mathematical representation that may be used to measure data profiles based on correlations between parameters in a data set. Mahalanobis distance differs from Euclidean distance in that Mahalanobis distance takes into account the correlations of the data set. Mahalanobis distance of a data set X (e.g., a multivariate vector) may be represented as:

$$MD_i = (X_i - \mu_x)\Sigma^{-1}(X_i - \mu_x)' \quad (1)$$

where $\mu_x$ is the mean of X and $\Sigma^{-1}$ is an inverse variance-covariance matrix of X. $MD_i$ weights the distance of a data point $X_i$ from its mean $\mu_x$ such that data samples or data points that are on the same multivariate normal density contour will have the same distance. Such data samples or data points may be used to identify and select correlated parameters from separate data groups having different variances.

Processor 202 may select input parameters as a desired subset of input variables such that the Mahalanobis distance between the normal data set and the abnormal data set is maximized or optimized. A genetic algorithm may be used by processor 202 to search input variables for the desired subset with the purpose of maximizing the Mahalanobis distance. Processor 202 may select a candidate subset of the input variables based on a predetermined criteria and calculate a Mahalanobis distance $MD_{normal}$ of the normal data set and a Mahalanobis distance $MD_{abnormal}$ of the abnormal data set. Processor 202 may also calculate the Mahalanobis distance between the normal data set and the abnormal data (i.e., the deviation of the Mahalanobis distance $MD_x = MD_{normal} - MD_{abnormal}$). Other types of deviations, however, may also be used.

After selecting the input parameters (e.g., intake manifold temperature, intake manifold pressure, ambient humidity, fuel rate, engine speed, etc.), processor 202 may generate virtual sensor model 334 to build interrelationships between the input parameters (e.g., having input parameter values 310) and the output parameters (e.g., having output parameter values 320) (step 440). In certain embodiments, virtual sensor model 334 may correspond to a computational model, such as, for example, a computational model built on any appropriate type of neural network. The type of neural network computational model that may be used may include back propagation, feed forward models, cascaded neural networks, and/or hybrid neural networks, etc. Particular types or structures of the neural network used may depend on particular applications. Other types of computational models, such as linear system or non-linear system models, etc., may also be used.

The neural network computational model (i.e., virtual sensor model 334) may be trained by using selected data records. For example, the neural network computational model may include a relationship between output parameters having output parameter values 320 (e.g., emissions levels, exhaust gas temperature levels, etc.) and input parameters having input parameter values 310 (e.g., intake manifold temperature, intake manifold pressure, ambient humidity, fuel rate, and engine speed, etc.).

The neural network computational model may be evaluated by predetermined criteria to determine whether the training is completed. The criteria may include desired ranges of accuracy, time, and/or number of training iterations, etc.

After the neural network has been trained (i.e., the computational model has initially been established based on the predetermined criteria), processor 202 may statistically validate the computational model (step 450). Statistical validation may refer to an analyzing process to compare outputs of the neural network computational model with actual or expected outputs to determine the accuracy of the computational model. Part of the data records may be reserved for use in the validation process.

Alternatively, processor 202 may also generate simulation or validation data for use in the validation process. This may be performed either independently of a validation sample or in conjunction with the sample. Statistical distributions of inputs may be determined from the data records used for modeling. A statistical simulation, such as Latin Hypercube simulation, may be used to generate hypothetical input data records. These input data records are processed by the computational model, resulting in one or more distributions of output characteristics. The distributions of the output characteristics from the computational model may be compared to distributions of output characteristics observed in a population. Statistical quality tests may be performed on the output distributions of the computational model and the observed output distributions to ensure model integrity.

Once trained and validated, virtual sensor model 334 may be used to predict output parameter values 320 when provided with input parameter values 310. Further, processor 202 may optimize virtual sensor model 334 by determining desired distributions of input parameter values 310 based on relationships between input parameter values 310 and desired distributions of output parameter values 320 (step 460). Part of the data records may likewise be reserved for use in the validation processes.

Processor 202 may analyze the relationships between desired distributions of input parameters and desired distributions of output parameters based on particular applications. For example, processor 202 may select desired ranges for output parameter values 320 (e.g., temperature levels, emissions levels, etc., that are desired or within a certain predetermined range). Processor 202 may then run a simulation of the computational model to find a desired statistical distribution for an individual input parameter (e.g., one of fuel rate, injection timing, intake manifold pressure, intake manifold temperature, IVA end of current, injection pressure, engine speed, certain delayed parameters, etc.). That is, processor 202 may separately determine a distribution (e.g., mean, standard variation, etc.) of the individual input parameter corresponding to the normal ranges of output parameter values 320. After determining respective distributions for all individual input parameters, processor 202 may combine the desired distributions for all the individual input parameters to determine desired distributions and characteristics for overall input parameters.

Alternatively, processor 202 may identify desired distributions of input parameter values 310 simultaneously to maximize the possibility of obtaining desired outcomes. In certain embodiments, processor 202 may simultaneously determine desired distributions of input parameter values 310 based on the zeta statistic. Zeta statistic may indicate a relationship between input parameters, their value ranges, and desired outcomes. Zeta statistic may be represented as $$\zeta = \sum_{1}^{j} \sum_{1}^{i} |S_{ij}| \left(\frac{\sigma_i}{\bar{x}_i}\right)\left(\frac{\bar{x}_j}{\sigma_j}\right), \quad (2)$$

where $\bar{x}_i$ represents the mean or expected value of an ith input; $\bar{x}_j$ represents the mean or expected value of a jth outcome; $\sigma_i$ represents the standard deviation of the ith input; $\sigma_j$ represents the standard deviation of the jth outcome; and $|S_{ij}|$ represents the partial derivative or sensitivity of the jth outcome to the ith input.

Under certain circumstances, $\bar{x}_i$ may be less than or equal to zero. A value of 3 $\sigma_i$ may be added to $\bar{x}_i$ to correct such a problematic condition. If, however, $\bar{x}_i$ is still equal to zero even after adding the value of 3 $\sigma_i$, processor 202 may determine that $\bar{\sigma}_i$ may also be zero, and that the model under optimization may be undesired. In certain embodiments, processor 202 may set a minimum threshold for $\sigma_i$ to ensure reliability of models. Under certain other circumstances, $\sigma_j$ may be equal to zero. Processor 202 may then determine that the model under optimization may be insufficient to reflect output parameters within a certain range of uncertainty. Processor 202 may assign an indefinite large number to $\zeta$.

Processor 202 may identify a desired distribution of input parameter values 310 such that the zeta statistic of the neural network computational model (i.e., virtual sensor model 334) is maximized or optimized. An appropriate type of genetic algorithm may be used by processor 202 to search the desired distribution of input parameter values 310 for the purpose of maximizing the zeta statistic. Processor 202 may select a candidate set input parameter values 310 with predetermined search ranges and run a simulation of virtual sensor model 334 to calculate the zeta statistic parameters based on input parameter values 310, output parameter values 320, and the neural network computational model (e.g., virtual sensor model 334). Processor 202 may obtain $\bar{x}_i$ and $\sigma_i$ by analyzing the candidate set input parameter values 310, and obtain $\bar{x}_j$ and $\sigma_j$ by analyzing the outcomes of the simulation. Further, processor 202 may obtain $|S_{ij}|$ from the trained neural network as an indication of the impact of the ith input on the jth outcome.

Processor 202 may select the candidate set of input parameter values 310 if the genetic algorithm converges (i.e., the genetic algorithm finds the maximized or optimized zeta statistic of virtual sensor model 334 corresponding to the candidate set of input parameter values 310). If the genetic algorithm does not converge, a different candidate set of input parameter values 310 may be created by the genetic algorithm for further searching. This searching process may continue until the genetic algorithm converges and a desired set input parameter values 310 is identified. Processor 202 may further determine desired distributions (e.g., mean and standard deviations) of input parameter values 310 based on the desired set of input parameter values 310. Once the desired distributions are determined, processor 202 may define a valid input space that may include any input parameter within the desired distributions (step 470).

During operation of machine 100, ECM 120 may use one or more virtual sensors 330 of virtual sensor network system 130 to extend a range of one or more physical sensors 140 and/or 142. For example, if computer system 200 is used to implement ECM 120, then processor 202 may determine trust levels of one or more of physical sensors 140 and/or 142 based on values being output from the physical sensor. ECM 120 may then determine, based on the trust level of the physical sensor, whether to use the output parameter values from the physical sensor (e.g., the physical output values), output parameter values 320 from a virtual sensor 330 (e.g., the virtual output values), or a combination of both to control machine 100. 100641 The trust level of the physical sensor is any type of indication reflective of the reliability of the physical sensor. In some embodiments, the trust level may be represented, e.g., by a numerical value, but other types of representations, such as non-numerical representations, may also be used. For example, the trust level of the physical sensor may be calculated based on the specification data for the physical sensor that may be provided by the manufacturer of the physical sensor. The trust level of the physical sensor may also be calculated based on testing or training data of the physical sensor or of another similar physical sensor. This data may be stored in memory 204, storage 212, or elsewhere.

Using a temperature sensor as an example, based on specification and/or testing data, it may be determined that the physical temperature sensor can accurately measure temperatures (i.e. has a specification range) between 0° C. and 100° C. Moreover, it may be determined that physical temperature sensor has one or more accuracy bands within the specification range of 0° C. and 100° C. For example, it may be determined that between 40° C. and 60° C., the physical temperature sensor can measure temperatures to an accuracy of ±1%, while between 0° C. and 40° C. and 60° C. and 100° C., the physical temperature sensor can measure temperatures with an accuracy of ±10%. In this case, if ECM 120 receives physical output values between 40° C. and 60° C., it may determine that the physical temperature sensor has a trust value of 0.99 for those values. On the other hand, if ECM 120 receives physical output values between 0° C. and 40° C. or 60° C. and 100° C., it may determine that the physical temperature sensor has a trust value of 0.90 for those values. Further, if ECM 120 receives physical output values outside of 0° C. to 100° C., it may determine that the physical temperature sensor has a trust value of 0.00.

While the physical temperature sensor has been described above as having discrete accuracy bands and a specification range that may be used to calculate trust levels, those skilled in the art will appreciate that physical sensor accuracy and corresponding accuracy bands of specification ranges may be represented in other ways. For example, the accuracy of a physical sensor may be determined to be a continuous or near-continuous curve, such as a distribution curve, with varying accuracies for different output values. In this case, the trust level along a range of physical output values may be a continuous function based on the continuous accuracy level curve. For example, the trust level may be a bell-curve with its peak in the middle of a sensor's specification range that tapers to 0 when it reaches the outer limits of the sensor's specification range. Moreover, while the trust levels have been described as numerical values less than one, any values along any scale may be used to represent the trust values. For example, the trust values may be represented on a scale of 1 to 10, 0 to 100, 0 to 1000, etc.

ECM 120 may determine a trust level for physical output values that are received from one or more of the physical sensors 140 and/or 142, and may determine, based on the trust level, whether to use the physical output value, a virtual output value, or a combination of both to control machine 100. In one embodiment, ECM 120 may use only the virtual output value if the trust level of the physical sensor is below a first threshold value, e.g., 0.80, may use only the physical output value if the trust level of the physical sensor is above a second threshold value, e.g., 0.90, and may combine the physical output value and the virtual output value if the trust level of the physical sensor is between the two threshold values. For example, ECM 120 may combine the two values by averaging the physical output value and the virtual output value.

In certain embodiments, ECM 120 may also determine a trust level for one or more virtual sensors. The trust level of a virtual sensor is any type of indication reflective of the reliability of the virtual sensor. In some embodiments, the trust level may be represented, e.g., by a numerical value, but other types of representations, such as non-numerical representations, may also be used. Trust levels, and/or the data used to calculate the trust levels, may be stored in memory 204, storage 212, or elsewhere.

In these embodiments, ECM 120 may determine whether to control machine 100 using the physical output values and/or the virtual output values based on the trust level of the virtual output values as well. For example, if ECM 120 determines that the physical output value cannot be used, e.g., the trust level of the physical sensor is below the first threshold level, as discussed above, then ECM 120 may also determine whether the virtual output value can be used. That is, ECM 120 may compare the trust level of the virtual sensor to a threshold value, such as the first threshold value, and if the trust level of the virtual sensor is also lower than the first threshold value, ECM 120 may issue an error or a fault, cease operation of machine 100, etc. On the other hand, if the trust level of the virtual sensor is equal to or greater than the threshold value, ECM 120 may use the virtual output value.

Moreover, ECM 120 may use the trust levels of both the physical sensor and the virtual sensor to combine the two sensor output values as a weighted average. For example, when ECM 120 combines the physical output value and the virtual output value, ECM 120 may calculate a weighted average of the two values that incorporates both trust levels. Thus, for a physical output value $V_p$ with a trust level $T_p$ and a virtual output value $V_v$ with a trust level $T_v$, ECM 120 may calculate a combined value equal to $V_p*T_p/(T_p+T_v)+V_v*T_v/(T_p+T_v)$. ECM 120 may then use this combined value to control machine 100.

The trust level of the virtual sensor may be calculated based on one or more of the data records used to train and establish the virtual sensor, as discussed above. For example, the trust level of a virtual output value (e.g. an output parameter value 320) from a virtual sensor may be calculated based on a deviation of the particular input parameter values 310 that produced the virtual output value from the training data set in the data records that was used to train virtual sensor 330, as discussed above. For example, during operation of machine 100, processor 202 may calculate a Mahalanobis distance for input parameter values 310 that were input to virtual sensor 330 to produce the particular virtual output value. The Mahalanobis distance may then be used to determine the trust level of the virtual sensor.

In one embodiment, the Mahalanobis distance calculated for input parameter values 310 may be compared to a valid range of Mahalanobis distances. The valid range may be determined, e.g., based on the training data set. For example, the valid Mahalanobis distance range may be between 0 and a value that is three standard deviations from the mean of the Mahalanobis distances calculated for the input parameter values in the training data set. The trust level may then be calculated as a piecewise linear function, such that a virtual output value with input parameter values at the mean of the training data set (e.g., with $MD_i=0$) has a trust level of 1.00, a virtual output value with input parameter values with $MD_i \geq 3\sigma$ has a trust level of 0.00, and a linear function from a point (0, 1.00) to a point (3σ, 0.00) represents the trust level for all output values with input parameter values having corresponding Mahalanobis distances between $MD_i=0$ and $MD_i=3\sigma$.

Moreover, while a piecewise linear function may be used to represent the trust levels, those skilled in the art will appreciate that any other type of function may be used. For example, one or more polynomial, rational, exponential, logarithmic, power, etc., functions may be used to represent the trust value of the virtual sensor between $MD_i=0$ and $MD_i=3\sigma$. Moreover, while the example above used a range of $MD_i=0$ to $MD_i=3\sigma$ for the range of non-zero trust values, any other range may be used that may or may not be based on the distribution of the training data. For example, 4σ, 5σ, etc., may be used as the point where the trust level function reaches a value of 0.00, or a predetermined number or value that is independent of the standard deviation of the training data may be used as that point.

Exemplary embodiments of how ECM 120 may use trust values of physical sensors and/or virtual sensors to extend the range of one or more physical sensors are discussed in greater detail below with regard to FIG. 5.

In other embodiments, ECM 120 may store trusted ranges of physical sensors and/or virtual sensors. For example, ECM 120 may store one or more trusted ranges for a physical temperature sensor. These trusted ranges may be determined based on, e.g., specification or testing data of the physical temperature sensor. For example, specification or testing data may determine that between 40° C. and 60° C., the physical temperature sensor can measure temperatures to an accuracy of ±1%, while between 0° C. and 40° C. and between 60° C. and 100° C., the physical temperature sensor can measure temperatures with an accuracy of ±10%. In this example, ECM 120 may store two trusted ranges, a first trusted range between 40° C. and 60° C. and a second trusted range between 0° C. and 40° C. and between 60° C. and 100° C. While only two ranges are used in the example above, those skilled in the art will appreciate that any number of ranges may be used and stored by ECM 120.

Similar ranges may also be determined for the virtual sensors, e.g., based on the training data. For example, a first range may be determined to be output values with corresponding input parameter values with a Mahalanobis distance in the range of $MD_i=0$ to $MD_i=\sigma$, and a second range may be determined to be output values with corresponding input parameter values with a Mahalanobis distance in the range of $MD_i=\sigma$ to $MD_i=3\sigma$. Again, any number of ranges may be used and the endpoints of each range may be determined in any way consistent with disclosed embodiments.

In embodiments where ECM 120 stores and uses trusted ranges, ECM 120 may compare the physical output values and/or virtual output values to a trusted range. Based on the comparison(s), ECM 120 may determine whether to control machine 100 using the physical output value, the virtual output value, or a combination of both. This way, ECM 120 may extend the range of the physical sensor using the virtual sensor. Exemplary embodiments of how ECM 120 may use trusted ranges of physical sensors and/or virtual sensors to extend the range of one or more physical sensors are discussed in greater detail below with regard to FIG. 6.

Industrial Applicability

The disclosed virtual sensor system may be applicable to any virtual sensor based system used to monitor and/or control a machine. Monitoring the output values from physical and virtual sensors of machine 100 to determine whether to control machine 100 based on the output values from the physical and/or virtual sensor may increase the range of values that may be sensed in order to control machine 100, thereby extending the range of the physical sensor beyond its specification range.

Figure 5:
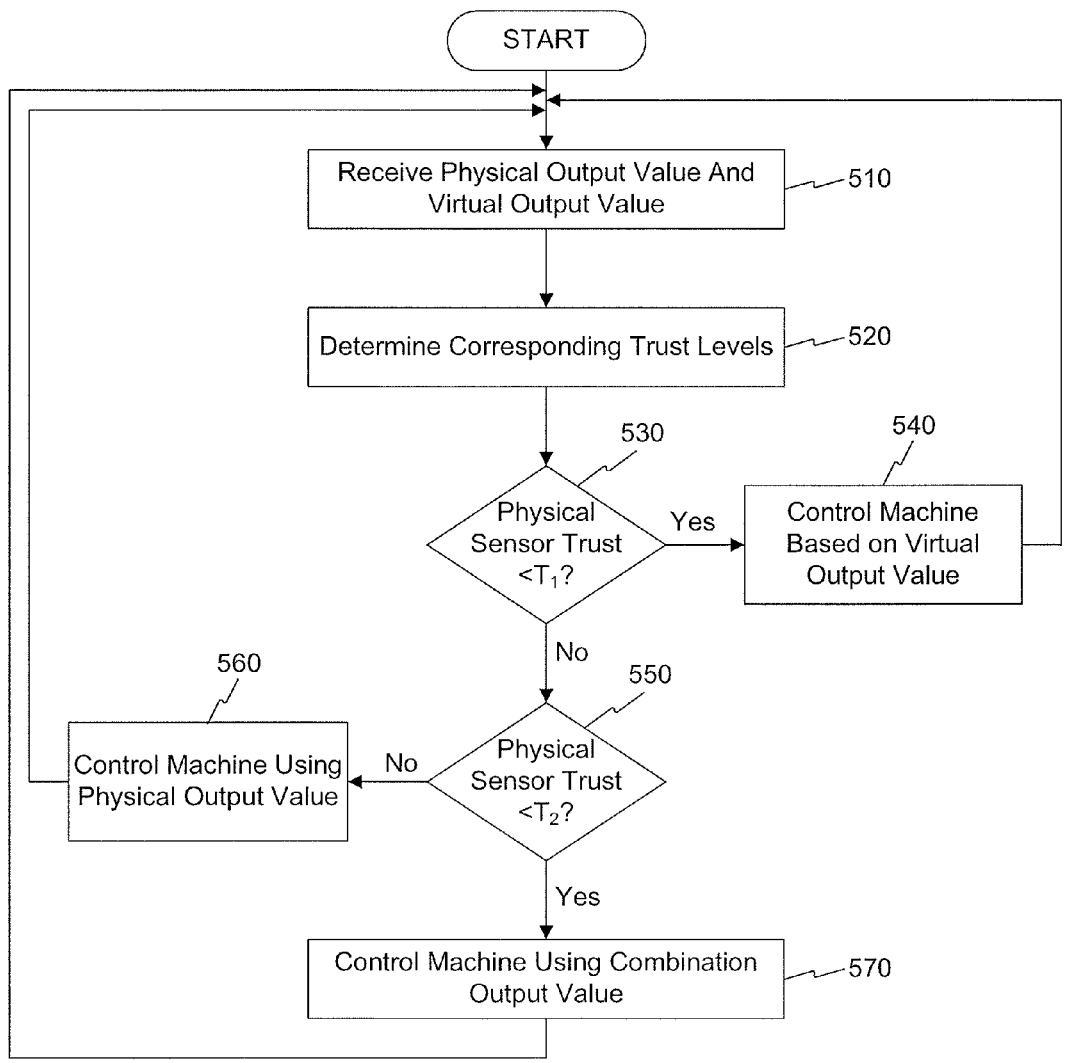
FIG. 5 is a flow chart illustrating an exemplary process that may be performed by an electronic control module of the machine of FIG. 1.

FIG. 5 shows an exemplary process that may be performed by ECM 120 to control engine 110. As shown in FIG. 5, ECM 120 may receive a physical output value from a physical sensor such as physical sensor 142, and may receive a virtual output value (e.g., a output parameter value 320) from a virtual sensor such as virtual sensor 330 (step 510). After receiving the physical output value and the virtual output value, ECM 120 may determine a trust level of the physical output value and may also determine a trust level of the virtual output value (step 520). For example, the trust levels may be calculated or determined according to one or more of the embodiments discussed above.

ECM 120 may then compare the trust level of the physical output value to a first threshold value $T_1$ (step 530). $T_1$ may be any value, and may be customizable by a user, such as an engineer, operator, etc., of machine 100 and/or ECM 120. In one embodiment, $T_1$ may be 0.80, for example, although other values may be used. If ECM 120 determines that the trust level of the physical sensor is less than $T_1$ (step 530, Yes), then ECM 120 may control machine 100 based on the virtual output value (step 540).

At step 540, when ECM 120 controls machine 100 based on the virtual output value, ECM 120 may use only the virtual output value to control machine 100 in one embodiment. That is, ECM 120 may replace the physical output value with the virtual output value. In another embodiment, ECM 120 may also compare the trust level of the virtual output value to a threshold value, such as $T_1$. Then, at step 540, ECM 120 may use the virtual output value to control machine 100 if the trust level of the virtual output value is greater than or equal to $T_1$. In this embodiment, if ECM 120 determines at step 540 that the trust level of the virtual output value is less than $T_1$, then ECM 120 may perform one or more machine protection functions, such as issuing an error or a fault to one or more controllers or to an operator of machine 100, or by ceasing operation of machine 100.

In still other embodiments, at step 540, ECM 120 may control machine 100 based on both the virtual output value and the physical output value. For example, ECM 120 may control machine 100 using an average or a weighted average of the virtual output value. As discussed above, the weighted average may be weighted based on the trust levels of the virtual output value and the physical output value. The weighted average may also be weighted based on only one trust level, such as the trust level of the physical output value. For example, the value used by ECM 120 to control machine 100 may be determined to be $V_p T_p + V_v(1-T_p)$ for a physical output value $V_p$ with a trust level of $T_p$ and a virtual output value $V_v$.

If, at step 530, ECM 120 determines that the trust level of the physical sensor is greater than or equal to $T_1$ (step 530, No), then ECM 120 may compare the trust level of the physical output value to a second threshold value $T_2$ (step 550). Second threshold value $T_2$ may be greater than first threshold value $T_1$. For example, $T_2$ may be 0.95, although other values may be used. If ECM 120 determines that the trust level of the physical sensor is greater than or equal to $T_2$ (step 550, No), then ECM 120 may control machine 100 using the physical output value (step 560).

On the other hand, if ECM 120 determines that the trust level of the physical sensor is less than $T_2$ (step 550, Yes), then ECM 120 may control machine 100 using a combination output value that is a combination of the physical output value and the virtual output value (step 570). For example, the combination output value may be an average of the physical output value and the virtual output value, may be a weighted average of the two, weighted based on, e.g., one or more of the trust levels of the physical output value and/or the virtual output value, may be a weighted average weighted based on some other value, etc.

As shown in FIG. 5, ECM 120 may return to step 510 after steps 540, 560, and/or 570, such that ECM 120 receives subsequent output values and repeats the process of FIG. 5 for the subsequent output values. That is, ECM 120 may continuously receive physical and virtual output values and compare trust levels of the output values to threshold values as discussed above with regard to FIG. 5. Thus, ECM 120 may continuously monitor the output values from a physical sensor, and may use a virtual sensor to extend the range of the physical sensor when it determines that a physical output value is outside of a trusted range of the physical sensor.

Moreover, because ECM 120 may be configured to continuously repeat the process in FIG. 5, e.g., at predetermined time intervals, such as every 0.1 ms, ECM 120 may continuously switch among using physical output values, virtual output values, or a combination of both to control machine 100, based on the trust level of the output value. Thus, ECM 120 may use a virtual output value when the physical output value is outside of a trusted range, but then switch back to using the physical output value when the physical output value returns to a trusted range.

Figure 6:
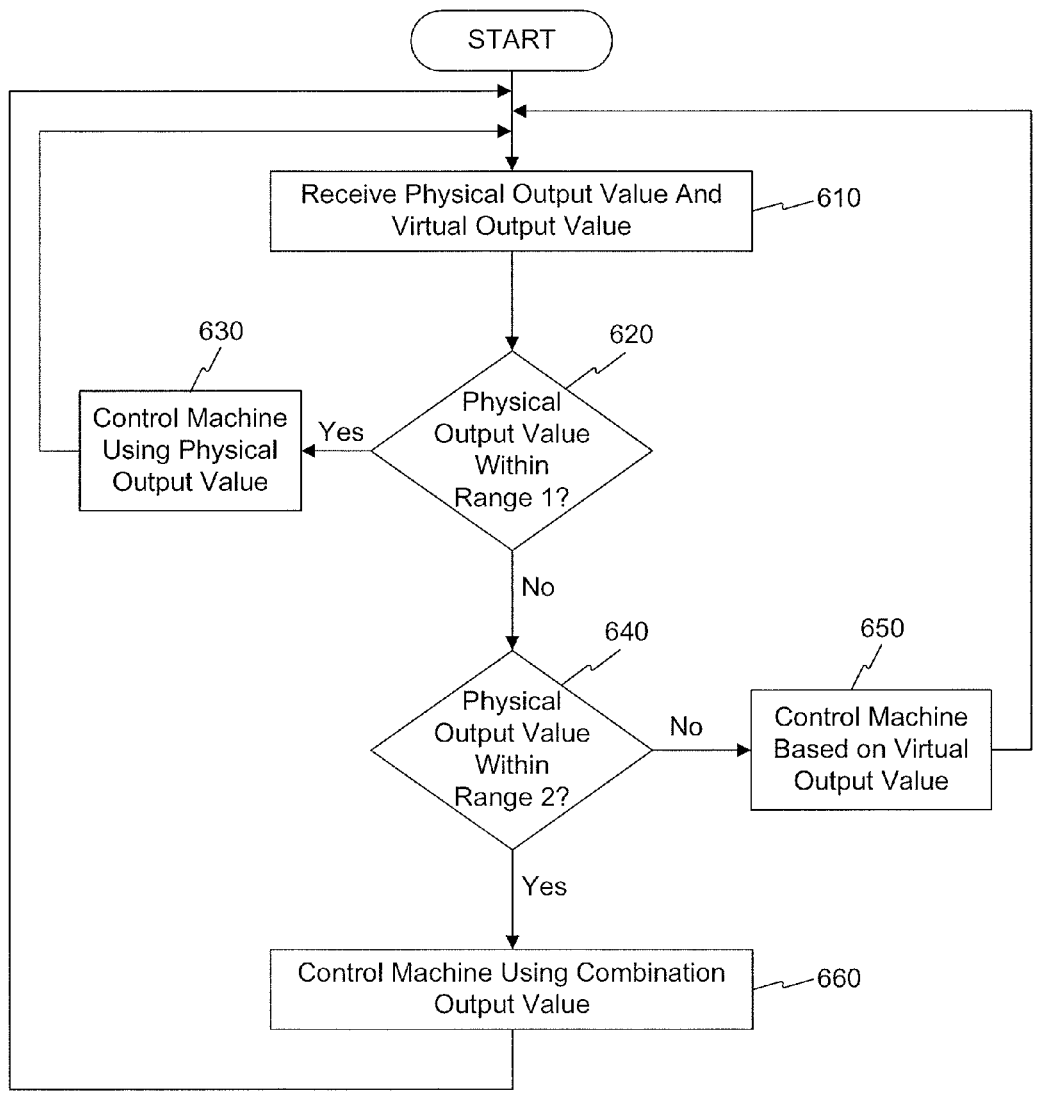
FIG. 6 is a flow chart illustrating another exemplary process that may be performed by an electronic control module of the machine of FIG. 1.

FIG. 6 shows another exemplary process that may be performed by ECM 120 to control engine 110. As shown in FIG. 6, ECM 120 may determine whether to control machine 100 using the physical output value or the virtual output values based on a comparison of the output values to predetermined trusted ranges.

ECM 120 may receive a physical output value from a physical sensor such as physical sensor 142, and may receive a virtual output value (e.g., an output parameter value 320) from a virtual sensor such as virtual sensor 330 (step 610). ECM 120 may compare the physical output value to a first range (Range 1) (step 620). If the physical output value is within Range 1 (step 620, Yes), ECM 120 may control machine 100 using the physical output value (step 630). On the other hand, if the physical output value is outside of Range 1 (step 620, No), then ECM 120 may compare the physical output value to a second range (Range 2) (step 640). Range 2 includes at least one value that is not included in Range 1. For example, Range 2 may include all or part of the values of Range 1, but includes at least one additional value. On the other hand, Range 2 may not intersect with Range 1, such that none of the values within Range 2 are within Range 1.

If, at step 640, ECM 120 determines that the physical output value is not within Range 2 (step 640, No), ECM 120 may control machine 100 based on the virtual output value (step 650). At step 650, when ECM 120 controls machine 100 based on the virtual output value, ECM 120 may use only the virtual output value to control machine 100 in one embodiment. That is, ECM 120 may replace the physical output value with the virtual output value. In another embodiment, ECM 120 may also compare the virtual output value to a trusted range for the virtual sensor. Then, at step 650, ECM 120 may use the virtual output value to control machine 100 if the virtual output value is within the trusted range. In this embodiment, if ECM 120 determines at step 650 that the virtual output value is outside the trusted range for the virtual sensor, then ECM 120 may perform one or more machine protection functions, such as issuing an error or a fault to one or more controllers or to an operator of machine 100, or by ceasing operation of machine 100. In still other embodiments, at step 650, ECM 120 may control machine 100 based on the virtual output value and the physical output value. For example, ECM 120 may control machine 100 using an average or a weighted average of the virtual output value.

If, at step 640, ECM 120 determines that the physical output value is within Range 2 (step 640, Yes), ECM 120 may control machine 100 based on a combination output value that is a combination of the physical output value and the virtual output value (step 660). For example, the combination output value may be an average of the physical output value and the virtual output value, may be a weighted average of the two, etc.

As shown in FIG. 6, ECM 120 may return to step 610 after steps 630, 650, and/or 660, such that ECM 120 receives subsequent output values and repeats the process of FIG. 6 for the subsequent output values. That is, ECM 120 may continuously receive physical and virtual output values and compare them to trusted ranges as discussed above with regard to FIG. 6. This way, ECM 120 may continuously monitor the output values from a physical sensor, and may use a virtual sensor to extend the range of the physical sensor when it determines that a physical output value is outside of a trusted range of the physical sensor.

Moreover, because ECM 120 may be configured to continuously repeat the process in FIG. 6, e.g., at predetermined time intervals, such as every 0.1 ms, ECM 120 may continuously switch among using physical output values, virtual output values, or a combination of both to control machine 100, based on the trust level of the output value. This way, ECM 120 may use a virtual output value when the physical output value is outside of a trusted range, but then switch back to using the physical output value when the physical output value returns to a trusted range.

It will be apparent to those skilled in the art that various modifications and variations can be made to the disclosed sensor system. Other embodiments will be apparent to those skilled in the art from consideration of the specification and practice of the disclosed sensor system. It is intended that the specification and examples be considered as exemplary only, with a true scope being indicated by the following claims and their equivalents.

What is claimed is:

1. A computer-implemented method for extending a range of a physical sensor comprising:
   receiving a physical output value from a physical sensor;
   receiving a virtual output value from a virtual sensor;
   determining a trust level of the physical sensor based on the physical output value; and
   responsive to determining that the trust level of the physical sensor is below a first threshold trust value, controlling a machine based on the virtual output value responsive to determining that the trust level of the physical sensor is below the first threshold trust value, wherein controlling the machine comprises:
   determining a trust level of the virtual sensor based on the virtual output value; and
   controlling the machine based on the virtual output value if the trust level of the virtual sensor is equal to or below a second threshold trust value.

2. The computer-implemented method of claim 1, wherein controlling the machine based on the virtual output value, further includes
   controlling the machine to cease operation if the trust level of the virtual sensor is above the second threshold trust value.

3. The computer-implemented method of claim 1, further including:
   comparing the trust level of the physical sensor to the first threshold trust value and a third threshold trust value; and
   responsive to determining that the trust level of the physical sensor is above the first threshold trust value and below the third threshold trust value,
      controlling the machine using a combined output value that is a weighted average of the physical output value and the virtual output value responsive to determining that the trust level of the physical sensor is above the first threshold trust value and below the third threshold trust value.

4. The computer-implemented method of claim 1, further including:
   comparing the trust level of the physical sensor to the first threshold trust value and a third threshold trust value; and
   responsive to determining that the trust level of the physical sensor is above the first threshold trust value and below the third threshold trust value:
      calculating a difference between the physical output value and a virtual output value; and
      controlling the machine using the virtual output value if the difference between the physical output value and the virtual output value exceeds a threshold difference value, or controlling the machine using the physical output value if the difference between the physical output value and the virtual output value is less than or equal to the threshold difference value.

5. The computer-implemented method of claim 1, further including:
   determining a trust level of the virtual sensor based on the virtual output value;
   comparing the trust level of the physical sensor to the first threshold trust value and a third threshold trust value; and
   responsive to determining that the trust level of the physical sensor is above the first threshold trust value and below the third threshold trust value, controlling the machine using one of the virtual output value or the physical output value that corresponds to a higher trust level.

6. The computer-implemented method of claim 5, wherein the trust level of the virtual sensor is based on a deviation of input values that correspond to the virtual output value from training values used to generate the virtual sensor.

7. The computer-implemented method of claim 1, further including:

determining a trust level of the virtual sensor based on the virtual output value;
comparing the trust level of the physical sensor to the first threshold trust value and a third threshold trust value; and
responsive to determining that the trust level of the physical sensor is above the first threshold trust value and below the third threshold trust value:
 determining a combined output value that is a weighted average of the virtual output value and the physical output value weighted based on the trust level of the virtual sensor and the trust level of the physical sensor; and
 controlling the machine using the combined output value.

8. The computer-implemented method of claim 7, wherein the trust level of the virtual sensor is based on a deviation of input values that correspond to the virtual output value from training values used to generate the virtual sensor.

9. The computer-implemented method of claim 1, further including, after controlling a machine based on the virtual output value responsive to determining that the trust level of the physical sensor is below the first threshold trust value:
 receiving a subsequent physical output value from the physical sensor;
 receiving a subsequent virtual output value from the virtual sensor;
 determining a subsequent trust level of the physical sensor based on the physical output value;
 determining that the subsequent trust level of the physical sensor exceeds or is equal to the first threshold trust value; and
 controlling the machine using the subsequent physical output value responsive to determining that the subsequent trust level of the physical sensor exceeds or is equal to the first threshold trust value.

10. A system comprising:
 a physical sensor configured to output a physical output value;
 a virtual sensor network configured to output a virtual output value; and
 an electronic control module configured to:
  receive the physical output value from the physical sensor;
  receive the virtual output value from the virtual sensor;
  determine a trust level of the physical sensor based on the physical output value;
  responsive to determining that the trust level of the physical sensor is below a first threshold value, control a machine based on the virtual output value responsive to determining that the trust level of the physical sensor is below the first threshold trust value, comprising:
   determining a trust level of the virtual sensor based on the virtual output value; and
   controlling the machine using the virtual output value if the trust level of the virtual sensor is equal to or below a second threshold trust value.

11. The system of claim 10, the electronic control module being further configured to
 cause the machine to cease operation if the trust level of the virtual sensor is above the second threshold trust value.

12. The system of claim 10, the electronic control module being further configured to:
 compare the trust level of the physical sensor to the first threshold trust value and a third threshold trust value; and
 responsive to determining whether the trust level of the physical sensor is above the first threshold trust value and below a third threshold trust value,
  control the machine using a combined output value that is an average of the physical output value and the virtual output value responsive to determining that the trust level of the physical sensor is above the first threshold trust value and below the third threshold trust value.

13. The system of claim 10, the electronic control module being further configured to:
 compare the trust level of the physical sensor to the first threshold trust value and a third threshold trust value; and
 responsive to determining that the trust level of the physical sensor is above the first threshold trust value and below the third threshold trust value:
  calculate a difference between the physical output value and a virtual output value; and
  control the machine using the virtual output value if the difference between the physical output value and the virtual output value exceeds a threshold difference value, or control the machine using the physical output value if the difference between the physical output value and the virtual output value is less than or equal to the threshold difference value.

14. The system of claim 10, the electronic control module being further configured to:
 determine a trust level of the virtual sensor based on the virtual output value;
 compare the trust level of the physical sensor to the first threshold trust value and a third threshold trust value; and
 responsive to determining that the trust level of the physical sensor is above the first threshold trust value and below the third threshold trust value, control the machine using one of the virtual output value or the physical output value that corresponds to a higher trust level.

15. The system of claim 14, wherein the trust level of the virtual sensor is based on a deviation of input values that correspond to the virtual output value from training values used to generate the virtual sensor.

16. The system of claim 10, the electronic control module being further configured to:
 determine a trust level of the virtual sensor based on the virtual output value;
 compare the trust level of the physical sensor to the first threshold trust value and a third threshold trust value; and
 responsive to determining that the trust level of the physical sensor is above the first threshold trust value and below the third threshold trust value:
  determine a combined output value that is a weighted average of the virtual output value and the physical output value weighted based on the trust level of the virtual sensor and the trust level of the physical sensor; and
  control the machine using the combined output value.

17. The system of claim 16, wherein the trust level of the virtual sensor is based on a deviation of input values that correspond to the virtual output value from training values used to generate the virtual sensor.

18. The system of claim 10, the electronic control module being further configured to:
 receive a subsequent physical output value from the physical sensor;

receive a subsequent virtual output value from the virtual sensor;

determine a subsequent trust level of the physical sensor based on the physical output value;

determine whether the subsequent trust level of the physical sensor exceeds or is equal to the first threshold trust value; and control the machine using the subsequent physical output value responsive to determining that the subsequent trust level of the physical sensor exceeds or is equal to the first threshold trust value.

19. A computer-implemented method for extending a range of a physical sensor comprising:

receiving a physical output value from a physical sensor;

receiving a virtual output value from a virtual sensor;

comparing the physical output value to a trusted range;

responsive to determining that the physical output value is outside of the trusted range, generating a combined output value that is a combination of the physical output value and the virtual output value; and controlling the machine using the combined output value, wherein controlling the machine comprises:

determining a trust level of the virtual sensor based on the virtual output value; and controlling the machine using the virtual output value if the trust level of the virtual sensor is equal to or below a second threshold trust value.

20. The computer-implemented method of claim 19, wherein the combined output value is a weighted average of the physical output value and the virtual output value.

* * * * *